US011388569B2

(12) United States Patent
Väänänen

(10) Patent No.: US 11,388,569 B2
(45) Date of Patent: Jul. 12, 2022

(54) INDEX OF EVERYDAY LIFE

(71) Applicant: Gobo Research Lab LLC, Wilmington, DE (US)

(72) Inventor: Mikko Kalervo Väänänen, Helsinki (FI)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/904,473

(22) Filed: Jun. 17, 2020

(65) Prior Publication Data

US 2020/0322767 A1  Oct. 8, 2020

Related U.S. Application Data

(60) Continuation of application No. 15/943,435, filed on Apr. 2, 2018, which is a division of application No. (Continued)

(51) Int. Cl.
*H04W 4/70* (2018.01)
*G08B 13/24* (2006.01)
(Continued)

(52) U.S. Cl.
CPC .......... *H04W 4/70* (2018.02); *G08B 13/2462* (2013.01); *G08B 21/0227* (2013.01);
(Continued)

(58) Field of Classification Search
CPC ..... H04W 4/70; H04W 4/80; H04W 12/1206; G08B 13/2462; G08B 21/0227; G08B 21/24
See application file for complete search history.

(56) References Cited

U.S. PATENT DOCUMENTS 6,043,746 A    3/2000 Sorrells
6,084,517 A    7/2000 Rabanne et al.
(Continued)

FOREIGN PATENT DOCUMENTS

EP    1908250 A1    4/2008
EP    2888695 A1    7/2015
(Continued)

OTHER PUBLICATIONS

In re Berg, 140F.3d 1428 46 USPQ2d 1226" 1998.
(Continued)

*Primary Examiner* — Jack K Wang
(74) *Attorney, Agent, or Firm* — Kilpatrick Townsend & Stockton

(57) ABSTRACT

A mobile phone connected to a fleet of radio transceiver chips that can be individually identified by the mobile station, which automatically are associated with a photo when the phone camera is used in proximity. The transceiver chips have a small loudspeaker, vibrator and/or light emitter for producing an alarm, and the transceiver chip also can determine and send back its location to the mobile phone. The mobile phone deduces its location by GPS or triangulation, and has an application which can be programmed to check the location of items given predetermined criteria are met, or upon user request. For example the mobile phone can be used to program luggage lists, and check whether everything is with the user at a time. The best mode involves typically a smartphone with relevant application software and RFID tags enhanced by light emitter, loudspeaker and/or vibrator and adhesive.

29 Claims, 4 Drawing Sheets

Related U.S. Application Data

15/802,515, filed on Nov. 3, 2017, now Pat. No. 9,973,913, which is a continuation of application No. 13/625,082, filed on Sep. 24, 2012, now Pat. No. 9,973,878, and a continuation of application No. 13/625,087, filed on Sep. 24, 2012, now abandoned.

(60) Provisional application No. 61/691,430, filed on Aug. 21, 2012.

(51) Int. Cl.
    *G08B 21/02*     (2006.01)
    *G08B 21/24*     (2006.01)
    *H04W 4/80*     (2018.01)
    *H04W 12/126*     (2021.01)
    *H04W 4/021*     (2018.01)
    *H04W 12/12*     (2021.01)

(52) U.S. Cl.
CPC .............. *G08B 21/24* (2013.01); *H04W 4/80* (2018.02); *H04W 12/126* (2021.01); *H04W 4/021* (2013.01); *H04W 12/12* (2013.01)

(56) References Cited

U.S. PATENT DOCUMENTS

| | | | |
|---|---|---|---|
| 6,297,737 B1 | 10/2001 | Irvin | |
| 6,331,817 B1 | 12/2001 | Goldberg | |
| 6,362,738 B1 | 3/2002 | Vega | |
| 6,501,378 B1 * | 12/2002 | Knaven | G08B 21/24 340/573.2 |
| 6,512,478 B1 * | 1/2003 | Chien | G01S 5/0289 340/572.1 |
| 6,624,752 B2 * | 9/2003 | Klitsgaard | G06K 19/07749 340/572.1 |
| 6,774,787 B1 | 8/2004 | Melbourne | |
| 6,788,199 B2 * | 9/2004 | Crabtree | G08B 21/0227 340/568.1 |
| 7,002,473 B2 | 2/2006 | Glick et al. | |
| 7,034,684 B2 * | 4/2006 | Boman | G08B 13/1427 340/568.1 |
| 7,148,801 B2 | 12/2006 | Crabtree et al. | |
| 7,365,645 B2 * | 4/2008 | Heinze | G08B 21/0275 340/572.1 |
| 7,898,414 B2 | 3/2011 | Spano | |
| 8,156,836 B2 | 4/2012 | Remmler et al. | |
| 8,219,558 B1 | 7/2012 | Trandal et al. | |
| 8,254,958 B2 | 8/2012 | Johnson | |
| 8,284,748 B2 | 10/2012 | Borghei | |
| 8,290,513 B2 | 10/2012 | Forstall et al. | |
| 8,364,525 B2 | 1/2013 | Kothiwal et al. | |
| 8,369,867 B2 | 2/2013 | Van Os et al. | |
| 8,666,367 B2 | 3/2014 | Sharp et al. | |
| 8,670,748 B2 | 3/2014 | Slack et al. | |
| 8,971,924 B2 | 3/2015 | Pai et al. | |
| 8,977,294 B2 | 3/2015 | De Atley | |
| 9,258,715 B2 | 2/2016 | Borghei | |
| 9,973,878 B2 | 5/2018 | Vaananen | |
| 9,973,913 B2 | 5/2018 | Vaananen | |
| 10,869,173 B2 | 12/2020 | Väänänen | |
| 2002/0017998 A1 | 2/2002 | Price | |
| 2002/0097152 A1 | 7/2002 | Mengrone et al. | |
| 2002/0126010 A1 | 9/2002 | Trimble et al. | |
| 2004/0077313 A1 | 4/2004 | Oba et al. | |
| 2004/0169587 A1 | 9/2004 | Washington | |
| 2004/0217859 A1 | 11/2004 | Pucci et al. | |
| 2005/0068168 A1 | 3/2005 | Aupperle et al. | |
| 2005/0134459 A1 | 6/2005 | Glick et al. | |
| 2005/0148339 A1 | 7/2005 | Boman et al. | |
| 2005/0285739 A1 | 12/2005 | Velhal et al. | |
| 2006/0028339 A1 | 2/2006 | Ogino et al. | |
| 2007/0061302 A1 | 3/2007 | Ramer et al. | |
| 2007/0096909 A1 | 5/2007 | Lally | |
| 2008/0062120 A1 | 3/2008 | Wheeler et al. | |
| 2008/0070588 A1 | 3/2008 | Morin | |
| 2009/0040048 A1 | 2/2009 | Locker et al. | |
| 2009/0175499 A1 | 7/2009 | Rosenblatt | |
| 2009/0210495 A1 | 8/2009 | Wolfson et al. | |
| 2009/0322537 A1 | 12/2009 | Tapp et al. | |
| 2010/0030743 A1 | 2/2010 | Lim et al. | |
| 2010/0039266 A1 | 2/2010 | Faris et al. | |
| 2010/0046791 A1 * | 2/2010 | Glickman | G06V 10/40 705/28 |
| 2010/0090011 A1 | 4/2010 | Wee | |
| 2011/0022661 A1 | 1/2011 | Alsina | |
| 2011/0084807 A1 | 4/2011 | Logan et al. | |
| 2011/0148625 A1 | 6/2011 | Velusamy | |
| 2011/0183717 A1 | 7/2011 | Brede | |
| 2011/0212702 A1 | 9/2011 | Howard et al. | |
| 2011/0227726 A1 | 9/2011 | Lee | |
| 2011/0288962 A1 | 11/2011 | Rankin, Jr. et al. | |
| 2012/0146786 A1 | 6/2012 | Kindeberg | |
| 2012/0214545 A1 | 8/2012 | Johnson | |
| 2013/0024793 A1 | 1/2013 | Rosenblatt | |
| 2014/0038511 A1 | 2/2014 | Hall | |
| 2014/0057609 A1 | 2/2014 | Vaananen | |
| 2014/0057646 A1 | 2/2014 | Vaananen | |
| 2014/0364099 A1 | 12/2014 | Pai et al. | |
| 2018/0070193 A1 | 3/2018 | Vaananen | |
| 2018/0227732 A1 | 8/2018 | Vaananen | |

FOREIGN PATENT DOCUMENTS

| | | | |
|---|---|---|---|
| JP | 2005135252 A | | 5/2005 |
| WO | 2014029911 A1 | | 2/2014 |

OTHER PUBLICATIONS

In re Goodman, 11 F.3d 1046, 29 USPQ2d 2010, 1993.
In re Longi, 759 F.2d 887, 225 USPQ 645, 1985.
In re Thorington, 418 F.2d 528, 163 USPQ 644, 1969.
In re Van Ornum, 686 F.2d 937,214 USPQ 761, 1982.
In re Vogel, 422 F.2d 438, 164 USPQ 619, 1970.
U.S. Appl. No. 13/625,082, "Advisory Action", dated Apr. 14, 2014, 3 pages.
U.S. Appl. No. 13/625,082, "Advisory Action", dated Sep. 11, 2013, 3 pages.
U.S. Appl. No. 13/625,082, "Final Office Action", dated Feb. 4, 2014, 15 pages.
U.S. Appl. No. 13/625,082, "Final Office Action", dated Jun. 21, 2013, 14 pages.
U.S. Appl. No. 13/625,082, "Final Office Action", dated Oct. 23, 2014, 12 pages.
U.S. Appl. No. 13/625,082, "Non-Final Office Action", dated Dec. 28, 2017, 11 pages.
U.S. Appl. No. 13/625,082, "Non-Final Office Action", dated Dec. 31, 2012, 12 pages.
U.S. Appl. No. 13/625,082, "Non-Final Office Action", dated Jun. 10, 2014, 14 pages.
U.S. Appl. No. 13/625,082, "Non-Final Office Action", dated Oct. 3, 2013, 15 pages.
U.S. Appl. No. 13/625,082, "Notice of Allowance", dated Mar. 21, 2018, 4 pages.
U.S. Appl. No. 13/625,082, "Notice of Allowance", dated Mar. 7, 2018, 8 pages.
U.S. Appl. No. 13/625,082, "Notice of Allowance", dated Oct. 12, 2017, 8 pages.
U.S. Appl. No. 13/625,087, "Advisory Action", dated Sep. 11, 2013, 3 pages.
U.S. Appl. No. 13/625,087, "Final Office Action", dated Feb. 19, 2014, 15 pages.
U.S. Appl. No. 13/625,087, "Final Office Action", dated Jun. 24, 2013, 15 pages.
U.S. Appl. No. 13/625,087, "Non-Final Office Action", dated Jan. 7, 2013, 12 pages.
U.S. Appl. No. 13/625,087, "Non-Final Office Action", dated Oct. 3, 2013, 14 pages.

(56) References Cited

OTHER PUBLICATIONS

U.S. Appl. No. 15/802,515, "Non-Final Office Action", dated Dec. 28, 2017, 11 pages.
U.S. Appl. No. 15/802,515, "Notice of Allowance", dated Feb. 28, 2018, 9 pages.
U.S. Appl. No. 15/943,435, "Final Office Action", dated Jun. 13, 2019, 9 pages.
U.S. Appl. No. 15/943,435, "Final Office Action", dated Mar. 19, 2020, 7 pages.
U.S. Appl. No. 15/943,435, "Non-Final Office Action", dated Dec. 28, 2018, 18 pages.
U.S. Appl. No. 15/943,435, "Non-Final Office Action", dated Oct. 18, 2019, 13 pages.
Counts, et al., "Supporting Social Presence through Lightweight Photo Sharing On and Off the Desktop", CHI Paper, vol. 6, No. 1, Apr. 24-29, 2004, pp. 559-606.
European Patent Application No. 13830603.0, "Extended European Search Report", dated Feb. 11, 2016, 6 pages.
European Patent Application No. 13830603.0, "Office Action", dated Mar. 4, 2020, 4 pages.
European Patent Application No. 13830603.0, "Office Action", dated Oct. 18, 2018, 2 pages.
Google, "Android 2.3.4 User's Guide", Google, AUG-2.3.4-106, Android mobile technology platform 2.3.4, May 20, 2011, 384 pages.
OpenTable, "OpenTable Announces Free iPhone Application Now Available on Apple App Store", Nov. 17, 2008.
PCT/FI2013/050809, "International Preliminary Report on Patentability", dated Feb. 24, 2015, 10 pages.
PCT/FI2013/050809, "International Search Report and Written Opinion", dated Nov. 28, 2013, 14 pages.
Persson, et al., "GeoNotes: A Location-based Information System for Public Spaces", Published in Hook et al. (eds.) "Designing Information Spaces: The Social Navigation Approach," Springer, 2002, pp. 151-175.
Rukzio, et al., "Automatic Form Filling on Mobile Devices", Pervasive and Mobile Computing, vol. 4, No. 2, Apr. 2008, pp. 161-181.
Shankland, "Google Latitude keeps tabs on friends' locations", Feb. 4, 2009.
U.S. Appl. No. 15/943,435, "Corrected Notice of Allowability", dated Sep. 30, 2020, 6 pages.
U.S. Appl. No. 15/943,435, "Notice of Allowance", dated Aug. 7, 2020, 9 pages.
EPO Patent Application No. 13830603.0, "Office Action", dated Oct. 21, 2021, 6 pages.

\* cited by examiner

INDEX OF EVERYDAY LIFE

CROSS-REFERENCES TO RELATED APPLICATIONS

This present application is a continuation of U.S. Non-Provisional patent application Ser. No. 15/943,435, filed Apr. 2, 2018, which is a divisional of U.S. Non-Provisional patent application Ser. No. 15/802,515, filed Nov. 3, 2017, now U.S. Pat. No. 9,973,913, which is a continuation of U.S. Non-Provisional patent application Ser. No. 13/625,087, filed Sep. 24, 2012; and a continuation of U.S. Non-Provisional patent application Ser. No. 13/625,082, filed Sep. 24, 2012, now U.S. Pat. No. 9,973,838; which claims the benefit of U.S. Provisional Patent Application No. 61/691,430, filed Aug. 21, 2012. The disclosures of which are herein incorporated by reference in their entirety for all purposes.

TECHNICAL FIELD

The invention relates to computerized search and wireless machine to machine (M2M) communication. More particularly, the invention relates to maintaining an index relation of everyday objects in a mobile phone for spatial search and verification.

BACKGROUND OF THE INVENTION

People conduct billions of searches for documents worldwide every day. This searching involves searching for information in documents, i.e. using the index relation {keywords} 4 Index,→{Documents}. This information retrieval is conducted by search engines such as Google.

People also search continuously for their kids, purse, credit cards, keys, lipstick, passport, seniors, car or any conceivable person or object in the spatial domain. It is known in the prior art that cargo is tracked e.g. by supplying GPS chips on cargo boxes. It is also known in the prior art that RFID tags can be used to track kids, where an RFID reader is in a mobile phone. This system is described in US2011/0227726 A1, which is cited here as reference.

It is also known in the prior art that RFID tags can be used to deliver information via WLAN connections. EP1908250B1 provides a mobile phone with RFID reader and WLAN transmitter integrated on a SIM card. It is used e.g. to realize a museum guide to provide info about exhibited objects via WLAN. This document is cited here as reference.

RFID's can be attached conveniently to articles, e.g. US2010/0090011 describes an RFID tag that has an adhesive on a first surface for attaching to an article. This document is cited here as reference.

It should also be noted that in the prior art sonar systems have been used to locate fish, and radar has been used to locate for example airplanes.

Also, when the inventor loses his mobile phone, he usually finds it by using another mobile phone to call it in accordance with the prior art.

Despite all these technologies, the average person spends a lot of his time every day to keep track of his belongings. Quite clearly, the prior art has substantial shortcomings. The prior art is not suited to managing the whole fleet of essential items that a person owns dynamically in changing practical life situations.

BRIEF SUMMARY OF THE INVENTION

The invention under study is directed towards a system and a method for effectively keeping track of personal belongings, relatives and friends so that it can be easily ensured and inspected that nothing is lost and everything relevant is with the user. It is an object of the invention to make all objects when lost as easily discoverable as a mobile phone is, whilst managing a large number of objects.

One aspect of the invention involves a mobile phone, typically a smartphone, which is used as the server and hub of the system and a plurality of small radio transceiver chips that can be attached to objects and people like "Post-It" notes. The user takes radio transceiver chip that typically has an adhesive on at least one surface, and attaches it to an article or item that is to be tracked, for example home keys. As the user attaches the radio transceiver chip to the home keys, he takes a photo of the keys, or writes a descriptive string like "Home keys" to the smartphone, which activates the radio transceiver chip and associates said chip to this descriptive data.

When the user is about to leave home, and cannot find his keys, he simply touches the photo of the home keys or the descriptive "Home keys" string on the smartphone display, or selects the home keys otherwise, depending on the user interface of the mobile phone. When the selection has been made, the mobile phone sends a signal to the radio transceiver chip, which receives said signal. Upon receiving the signal from the mobile phone, the radio transceiver chip produces an alarm, such as a sound, a flash of light, a vibration, or all or some of the aforementioned. This allows the user to find the home keys using the assistance provided by the alarm. Naturally as other items or even people are attached with radio transceiver chips, the user can find any item in his or her proximity by simply touching the picture or name of the item or person, and observing where the alarm comes from.

Another embodiment of the invention makes it possible to manage a collection of personal possessions in different situations of everyday life. Suppose the user is going to abroad for a trip of few days, e.g. from the EU to the US. The user, like most people will have a collection of mandatory items which he always takes with him. These for example may include: 1) home keys, 2) wallet, 3) passport, 4) ESTA-security clearance forms, 5) credit card, 6) airline ticket copies, 7) toothbrush, 8) electric shaver, 9) medication, 10) electronic adapter, 11) mobile phone, 12) laptop computer, 13-15) chargers for all electronic devices, and so on. Suppose that each of these items has now been labelled with a radio transceiver chip attached to each item as explained before. The user could exit the home, and select each item individually, and observe whether there is an alarm to make sure that the user is carrying the necessary item with him or in his luggage. This would be tedious and time consuming though, as 15 checks would need to be made individually.

Instead, in one embodiment the user simply selects a "US trip" from his mobile phone. The mobile station will now send a signal to each transceiver chip on each item at the same time.

In one embodiment they all (transceiver chips) produce alarms. The user can then observe if all alarms from all items were present. This embodiment of the invention however has a more preferable embodiment. In the preferred embodiment each transceiver chip receives a signal from the mobile station, and sends a radio signal back to the mobile station in response. The mobile station receives the response signals and tracks which items had a satisfactory response signal and which items had a non-satisfactory response signal or no response at all. The mobile station then alerts the user of those items that did not provide a satisfactory response signal.

For example, if the user is going to the US from the EU, he could exit his home and get into the elevator with his luggage. Whilst travelling in the elevator, he could select "US trip" from his mobile phone, and the mobile phone would scan all 15 items on the list. If there was no response from the transceiver chip attached to the passport, the mobile phone would alert the user by flashing "Passport missing!" message on the display. If a satisfactory response would have been received from all transceiver chips, the mobile phone could show a message: "All items detected!" or something similar on the display, to notify the user that he has all items with him and is cleared to travel.

In one aspect of the invention, the radio connection between the transceiver chip and mobile phone is very short range, and the item is detected as present when there is a response and detected as missing when there is no response. In a more elaborate embodiment, it is also possible that the transceiver chip location is determined by GPS, triangulation by base stations or other radio transceivers or another satellite system and communicated back to the mobile station. The mobile station will then compare its own position to the position of the radio transceivers and determine whether the items are with the user or in possession of the user. Alternatively the relative position between the mobile station and transceiver chips could also be deduced based on sonar and/or radar communication in some embodiments.

Some or all of the aforementioned advantages of the invention are accrued also with a system that can tag locations of the user, for example by input from the user. One location that could be tagged in accordance with the invention could be the home of the user, another location the workplace of the user. Now, the mobile phone knows the time and location of the user and it could thus be programmed with scripts, i.e. rules, which remind the user if he is forgetting something. For example, if the user is close to the exit door of his home, the mobile phone displays "home key missing" if the user does not have the home key in e.g. 1 metre proximity. If the time is during office hours, the same is done for the office keys. So, at 9.00 am, during office hours, the user is about to leave home with the home keys in his pocket, but no office keys with him. As the user exits the home, the mobile station should alert the user of the missing office keys. Once receiving the alert, the user will want to know where the office keys are. In one embodiment, the mobile station also notes the current location of the item, for example like: "Office keys missing, found in home" if the transceiver chip associated with office keys is detected in a location that is sufficiently close to the location tag "home". Location tag is typically created by storing the location co-ordinates, or relative location data, characteristic of a place, such as "home", into the mobile station for later recognition.

A communication system in accordance with the invention comprises a radio transceiver chip and a radio transceiver incorporated into a computer arranged to communicate with said transceiver chip, and is characterized in that
said transceiver chip is arranged to be attached to an item, which item is an object or a person, and said computer is arranged to send a signal to said transceiver chip and,
said transceiver chip is arranged to produce a sound, light and/or vibration signal in response to receiving said sent signal.

A communication method in accordance with the invention comprises a radio transceiver chip and a radio transceiver incorporated into a computer, communicating with said transceiver chip, and is characterized in that
said transceiver chip is attached to an item, which item is an object or a person, and said computer sends a signal to said transceiver chip and,
said transceiver chip produces a sound, light and/or vibration signal in response to sending said signal.

A memory unit comprising a software program product in accordance with the invention comprises a radio transceiver chip software and a radio transceiver software incorporated into a computer arranged to communicate with said transceiver chip software, and is characterized in that
said transceiver chip is arranged to be attached to an item, which item is an object or a person, and said computer is arranged to send a signal to said transceiver chip and is characterized in that,
said transceiver chip software is arranged to produce a sound, light and/or vibration signal in response to receiving said sent signal.

A communication system in accordance with the invention comprises a radio transceiver chip and a radio transceiver incorporated into a mobile station arranged to communicate with said transceiver chip, and is characterized in that
said transceiver chip is arranged to be attached to an item, which item is an object or a person, and said mobile station is arranged to send a signal to said transceiver chip and is characterized in that,
said transceiver chip attached to item and said mobile station are arranged to communicate to determine the relative or absolute location of said transceiver chip,
a deviation exceeding a threshold value in the relative or absolute location of said transceiver chip from a specified relative or absolute location value stored or received on said mobile station is arranged to be indicated by the mobile station to the user of said mobile station.

A communication method in accordance with the invention comprises a radio transceiver chip and a radio transceiver incorporated into a mobile station communicates with said transceiver chip, and is characterized in that
said transceiver chip is attached to an item, which item is an object or a person, and said mobile station sends a signal to said transceiver chip,
said transceiver chip attached to item and said mobile station communicate to determine the relative or absolute location of said transceiver chip,
a deviation exceeding a threshold value in the relative or absolute location of said transceiver chip from a specified relative or absolute location value stored or received on said mobile station is indicated by the mobile station to the user of said mobile station.

A memory unit comprises a software program product in accordance with the invention, and comprises a radio transceiver chip software and a radio transceiver software arranged incorporated into a mobile station arranged to communicate with said transceiver chip software, and is characterized in that
said transceiver chip is arranged to be attached to an item, which item is an object or a person, and said mobile station is arranged to send a signal to said transceiver chip, said transceiver chip software attached to item and said mobile station are arranged to communicate to determine the relative or absolute location of said transceiver chip, a deviation exceeding a threshold value in the relative or absolute location of said transceiver chip from a specified relative or absolute location value stored or received on said mobile station software is arranged to be indicated by the mobile station to the user of said mobile station.

A communication system in accordance with the invention, comprising a radio transmitter chip and a radio receiver incorporated into a mobile station arranged to communicate with said transmitter chip is characterized in that, said transmitter chip is arranged to be attached to an item, which item is an object or a person, said mobile station is arranged to receive a signal from said transmitter chip, said transmitter chip attached to item and/or said mobile station are arranged to determine the relative or absolute location of said transceiver chip, a deviation exceeding a threshold value in the relative or absolute location of said transmitter chip from a specified relative or absolute location value stored or received on said mobile station is arranged to be indicated by the mobile station to the user of said mobile station.

The invention has a multitude of advantages. With the invention the user can stay on track of where his belongings are, and inspect whether he has all necessary belongings in a very short time. The invention reduces the time spent on looking after lost objects and worrying whether everything was packed and where some items are.

In addition and with reference to the aforementioned advantage accruing embodiments, the best mode of the invention is considered to be a mobile phone connected to a fleet of transceiver chips that can be individually identified by the mobile station, which automatically are associated with a photo when the phone camera is used in proximity. The transceiver chips have a small loudspeaker, vibrator and/or light emitter for producing an alarm, and the transceiver chip also can determine and send back its location to the mobile phone. The mobile phone deduces its location by GPS or triangulation, and has an application which can be programmed to check the location of items given predetermined criteria are met, or upon user request. For example the mobile phone can be used to program luggage lists, and check whether everything is with the user at a time. The best mode involves typically a smartphone with relevant application software and RFID tags enhanced by light emitter, loudspeaker and/or vibrator and adhesive.

BRIEF DESCRIPTION OF THE DRAWINGS

In the following the invention will be described in greater detail with reference to exemplary embodiments in accordance with the accompanying drawings, in which FIG. 1 demonstrates an embodiment 10 of the inventive communication system as a block diagram.

Some of the embodiments are described in the dependent claims.

DETAILED DESCRIPTION OF THE INVENTION

Figure 1:
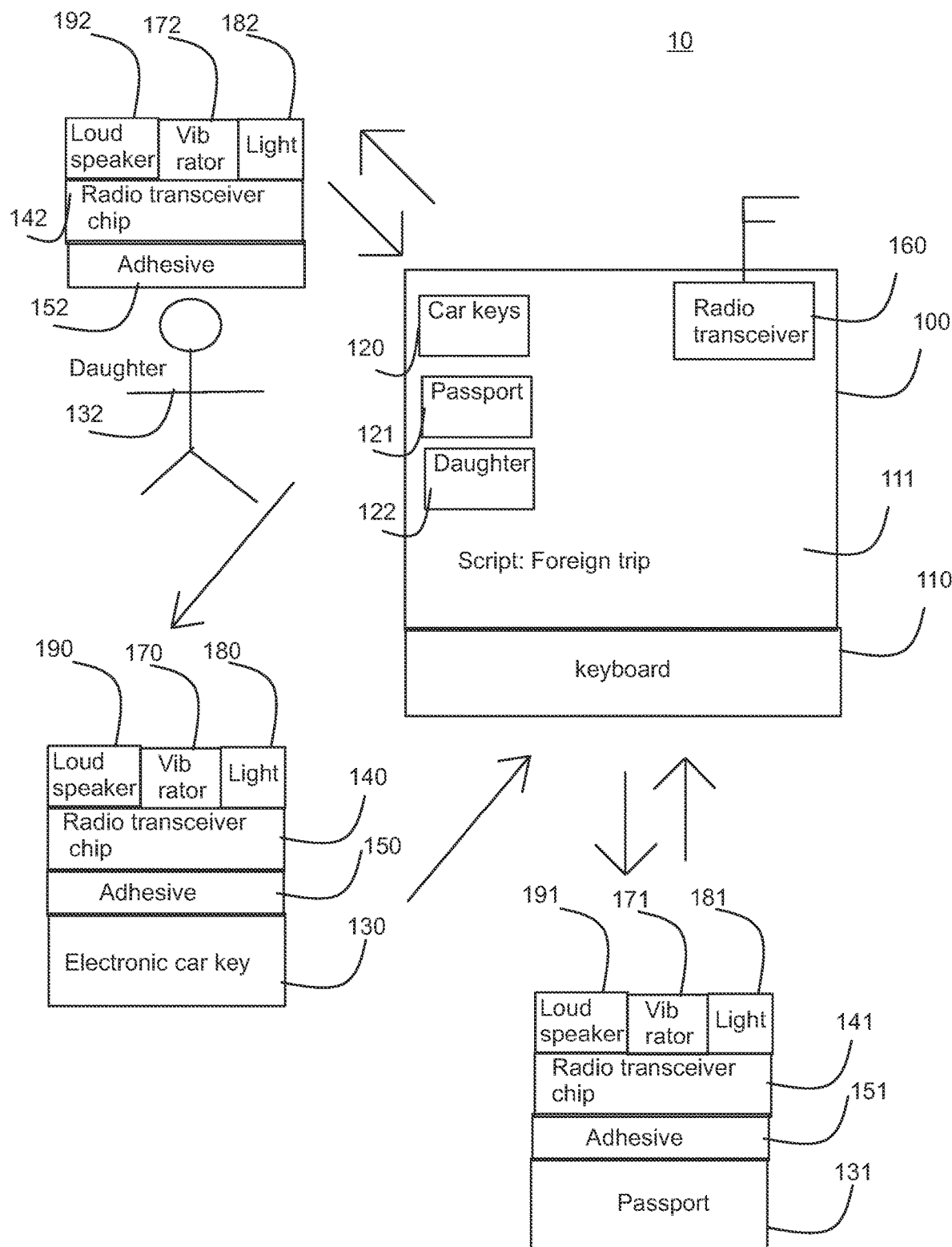

FIG. 1 displays an embodiment 10 of the invention as a block diagram. The computer 100 is either a personal computer, tablet computer, mobile station and/or a mobile phone. It has a keyboard 110 and a screen 111, or a touch-sensitive screen, and a radio transceiver 160. In some embodiments the computer 100 is an Apple iPhone, Google Android phone or a Microsoft Windows phone, or a Facebook compatible phone.

The computer 100 is designed to keep track of any of the following items: Car keys 130, passport 131 or daughter 132 of the user. These items have a radio transceiver chip 140, 141, 142 attached.

The radio transceiver chip 140 is attached to the car keys 130 by means of an adhesive. In some embodiments the radio transceiver chip 140 is of the shape, size and appearance of a small Post-it note; it has an adhesive 150, typically glue on the one side. On the other side it has different means for signaling directly to a human, including any of the following: a light emitter 180, a loudspeaker 190 or a vibrator 170. Similarly the passport 131 of the user has an inventive radio transceiver chip 141 unit attached to it. The radio transceiver chip 140, 141, 142 is typically also of the shape, size and appearance of a small Post-it note; it has an adhesive 151, typically glue on the one side for attaching to the passport. On the other side it has different means for signaling, including any of the following: a light emitter 181, a loudspeaker 191 or a vibrator 171.

The radio transceiver chip units 140, 141, 142 typically have at least one radio antenna for communication, a power source, a battery, a microprocessor and digital memory, such as ROM, RAM, and/or EEPROM. The radio transceiver chips 140, 141, 142 typically do not have any keyboard, and they have no screen either, which allows to manufacture them in small size, low cost, and high quantities, like Post-It sheets. The levels of electric power, memory, or processing power are typically very low, as the radio transceiver chips 140, 141, 142 has quite a limited function. In some embodiments the radio transceiver chip units 140, 141, 142 may be passive i.e. without a power source and battery, and be powered by the inductive energy of the incoming radio signal. The radio transceiver chips 140, 141, 142 are typically the size of a square centimeter, or 0.5 cm*0.5 cm in area or the like, so they can be attached to the smaller articles like keys and sunglasses without disturbance to the item itself, but are still easy to manipulate with fingers.

In some embodiments the radio transceiver chip units 140, 141, 142 are small GPS (Global Positioning system), NFC (Near Field Communication), RFID (Radio Frequency Identification Device) and/or Bluetooth-compliant radio transceiver chips. The radio transceiver 160 in the computer 100 is also typically a GPS (Global Positioning system), NFC (Near Field Communication), RFID (Radio Frequency Identification Device) and/or Bluetooth-compliant radio transceiver. Preferably the connection between transceiver chip units 140, 141, 142 and the computer 100 is a direct connection via a radio path. In other embodiments the connection between transceiver chip units 140, 141, 142 and the computer 100 is supported by a base station, such as a WLAN base station, and/or is via the cellular telephony network.

This connection can be a duplex connection, where information is communicated between the transceiver chip units 140, 141, 142 and the computer, or the connection can be unidirectional. In a sophisticated embodiment, the transceiver chip units 140, 141, 142 receive data transmissions from the computer 100 via radio, and respond to these via radio. In one unidirectional embodiment the radio transceiver chip units 140, 141, 142 merely receive data transmissions from computer, and send signals to the human user via any of the following: a light emitter 181, a loudspeaker 191 or a vibrator 171. In the sonar and/or radar embodiment, the radio transceiver chip units 140, 141, 142 are replaced or supplemented by sonar and/or radio reflectors.

It should be noted that in the embodiment where the computer 100 is a mobile phone, said mobile phone 100 will also typically have normal cellular radio transceivers in addition, which are typically compliant with any of following standards: UMTS- (Universal Mobile Telecommunication System), GSM- (Global System for Mobile Telecommunications), WAP- (Wireless Application Protocol), Teldesic-, Inmarsat-, Iridium-, GPRS- (General Packet Radio Service), CDMA- (Code Division Multiple Access), GPS- (Global Positioning System), 3G-, 4G-, Bluetooth-, WLAN- (Wireless Local Area Network), and/or WCDMA (Wideband Code Division Multiple Access) in accordance with the invention.

In one embodiment the radio transceiver chip 140, 141, 142 units are compliant with the aforementioned cellular telephony standards, and thus a signal can be sent to said radio transceiver chip units 140, 141, 142 via the cellular communication network. In this particular embodiment the radio transceiver chip units 140, 141, 142 could have telephone numbers. In one embodiment, for example the telephone number of the mobile phone could have e.g. 100 extension numbers, which would be the numbers of the radio transceiver chip units 140, 141, 142.

The radio transceiver chip 140, 141, 142 units are typically sold with the mobile phones or computers 100. Alternatively, the radio transceiver chip 140, 141, 142 units can be sold like Post-It stationery in supermarkets, typically in a pack of varying quantity or individually. When the user obtains a new item to be tracked, for example buys a new car with a new set of keys 130, he simply attaches the radio transceiver chip 140 like a Post-It stamp is attached to a wall or a table: he presses the surface with the adhesive 150 against the item 130 to be tracked. In some embodiments the transceiver chip unit 140 is also activated on the computer 100 in some way, for example by forming a radio connection and choosing activate or the like.

In some embodiments the radio transceiver chip 140, 141, 142 unit is passive, i.e. it does not have an electric power source. In these embodiments the radio transceiver chip 140, 141, 142 generates the required power from the incoming radio transmission, similarly to a passive RFID tag. In other embodiments the radio transceiver chip 140, 141, 142 unit is equipped with a small photovoltaic cell for power production from incident light. In some embodiments the radio transceiver chip 140, 141, 142 unit is equipped with a kinetic spring system found in up-scale watches, such as the Omega Apollo Moon Watch, which stores mechanical motion and uses it for power subsequently. In some embodiments the radio transceiver chip 140, 141, 142 unit comprises both a system for storing mechanical kinetic energy and a photovoltaic cell and/or a battery which can be charged by one, other or both of said systems. This is preferable sometimes as the chip gets charged both in the dark whilst in motion, and in the light in a moving and stationary state.

In some embodiments the radio transceiver chip 140, 141, 142 unit is just a radio transceiver and a SIM-card, or data stored on SIM, e.g. "software SIM".

In some embodiments the radio transceiver chip 140, 141, 142 unit is replaced or supplemented with a sonar and/or radar reflector, transmitter and/or receiver. In this embodiment the computer 100 needs to be similarly equipped, i.e. comprise a sonar and/or radar transmitter and receiver and/or transceiver.

In this application the radio transceiver chip unit 140, 141, 142 may have several receive-transmit modes, for example: radio-radio, radio-sound, radio-light, radio-vibration. In the sonar or radar embodiments, it is possible and in accordance with the invention that the transceiver unit 140, 141, 142 is no longer a radio or a chip unit, but a passive reflector, receiving sonar or radar signal from a sonar and/or radar transmitter associated with the computer 100 and transmitting it back by reflection to said computer 100.

The logical connection to the radio transceiver chip 140, 141, 142 units is displayed on the computer 100 screen 111: the car keys 130 are associated with the icon 120, the passport 130 is associated with the icon 121, and the icon 122 is associated with the little daughter 132 of the user who is simply wearing the radio transceiver chip unit 142 in a diaper or an article of clothing or it is adhered to the skin of the daughter like a small Post-It note would. It is also quite probable that a soft beep 192 and a vibration 172 initiated by the transceiver chip unit 142 could be learned by the child to mean that mother or father is looking for her.

In some embodiments the icons 120, 121, 122 feature a photo of the item that they are associated with. In some embodiments the photo is taken with a camera in the computer or associated with the computer. For example, especially in the embodiment where the computer is a smartphone with a camera, the user may hold the item with the transceiver chip unit 140 close by, and as the user snaps a picture of the keys with the camera, the mobile phone 100 automatically activates the radio transceiver chip unit 140 by sending an activation signal, which responds to the activation signal and associates said radio transceiver chip unit 140 with the photo. In some embodiments the sent activation signal could be associated with the photo, in some embodiments the response to it. In some embodiments the user inputs a text string to name the relevant radio transceiver chip unit 140, for example by inputting "Car keys" as is shown on screen 111 in icon 120. The aforementioned association of names or pictures to icons representing items works similarly in the sonar and/or radar embodiments: When the camera button is pressed or text entered sonar and/or radar radiation is sent from the computer 100, and it is the reflected signal from the sonar and/or radar reflectors on said item 130 that is associated with the said text or picture identifier data.

In some embodiments, when the user presses the relevant icon, a signal is sent to the radio transceiver chip unit, which then responds either by producing a sound, light and/or vibration signal and/or by responding via radio with a data signal, which may include location data of radio transceiver chip unit 140. For example when the user wishes to find his car keys 130, he selects icon 120 on the computer 100 display or presses icon 120 on a mobile phone touch sensitive display. The computer 100 then sends a radio signal to the radio transceiver chip unit 140. Upon receipt of said signal, in one embodiment the radio transceiver chip unit 140 energises or controls the loudspeaker 190 to produce an audible beep, music, or any sound signal. Alternatively or to supplement the said sound signal, the radio transceiver chip unit 140 energises or controls the light 180 to flash a light signal. Also, alternatively or to supplement the said sound signal and/or light signals, the radio transceiver chip unit 140 energises or controls the vibrator 170 to vibrate. In some embodiments the radio transceiver chip unit 140 energises and controls any of the following: loudspeaker 190, light 180, vibrator 170.

The user tries to observe any sound-, light- and/or vibration signals to find the car keys 130. In the embodiment where the radio transceiver unit returned a data signal containing location data, the computer 100 displays the location data to the user, preferably in an understandable form, such as a map, relative distance, co-ordinates, or the like that will help the user to find the car keys 130.

The adhesive 150, 151, 152 is typically glue, but it can be another type of, e.g. mechanical adhesion mechanism in some embodiments of the invention also.

In some embodiments radio transceiver chip unit 140, 141, 142 may be attached to a door and/or window, and the computer 100 is arranged to determine whether said door and/or window is closed or open based on location data received or obtained from radio transceiver chip unit 140, 141, 142. In some embodiments radio transceiver chip unit 140, 141, 142 may comprise a pressure sensor, and the pressure value measured by said pressure sensor is used to determine whether the door and/or window is closed and/or locked. Said radio transceiver chip unit 140, 141, 142 unit may either send a measured pressure data value to computer 100, or a data value indicating closed/open/locked/unlocked based on said measured pressure. For example if pressure exceeds value X at radio transceiver chip unit 140, 141, 142, the door or window is locked, and this data is arranged to be sent to computer 100. If the pressure exceeds value Y at radio transceiver chip unit 140, 141, 142, the door or window is closed, and this data is arranged to be sent to computer 100. If the pressure does not reach value X at radio transceiver chip unit 140, 141, 142, the door or window is unlocked, and this data is arranged to be sent to computer 100. If the pressure does not reach value Y at radio transceiver chip unit 140, 141, 142, the door or window is open, and this data is arranged to be sent to computer 100. This way the user can check from mobile station or computer 100 whether the door is locked & closed, unlocked & closed or open when he is away. Similarly, if the radio transceiver chip unit 140, 141, 142 is attached to the latch of the lock, or to the side of the door, the positions in closed/open and locked/unlocked states can stored to the mobile station 100, and preferably tagged as explained before, and the position of radio transceiver chip unit 140, 141, 142 is used to determine the state of the lock and/or door and communicate the state closed/open and locked/unlocked to the user of the computer or mobile station 100 on a display or screen.

It should be noted that in some embodiments different radio transceiver chip units 140, 141, 142 are arranged to control and/or produce different sound, light and/or vibration signals, so that the user can distinguish said radio transceiver chip units 140, 141, 142, and items 130, 131, 132 to which they are attached, from one another based on the said signals.

It should be noted that any features, phases or parts of the method 10 can be freely permuted and combined with embodiments 20, 30 and/or 40 in accordance with the invention.

Figure 2:
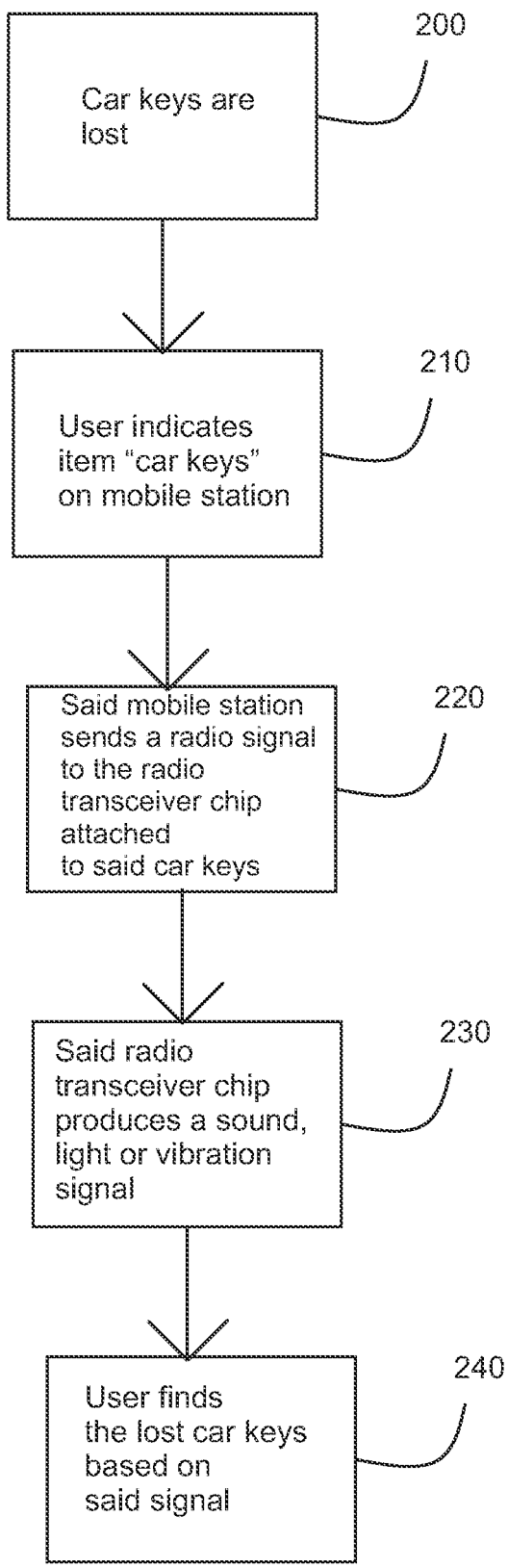
FIG. 2 demonstrates an embodiment 20 of the inventive communication method in accordance with the invention as a flow diagram.

FIG. 2 demonstrates an embodiment 20 of the inventive communication method in accordance with the invention as a flow diagram. In phase 200 the car keys are lost, and the user subsequently discovers that he is missing the keys. In phase 210 the user indicates "car keys" on his computer or mobile phone. In phase 220 the mobile station sends a radio signal to the radio transceiver chip unit attached to the car keys. In phase 230 the radio transceiver chip unit produces a sound, light and or vibration signal as discussed before. Based on the said signal, or assisted by the said signal the user finds the lost car keys in phase 240.

In the sonar/radar embodiment, a sonar and/or radar signal would be produced in phase 220 to replace the radio signal, the signal would be reflected in phase 230 from the reflector attached to the car keys, and based on the reflected signal the mobile station of the user would display instructions to discover the car keys to the user in phase 240.

It should be noted that any features, phases or parts of the method 20 can be freely permuted and combined with embodiments 10, 30 and/or 40 in accordance with the invention.

Figure 3:
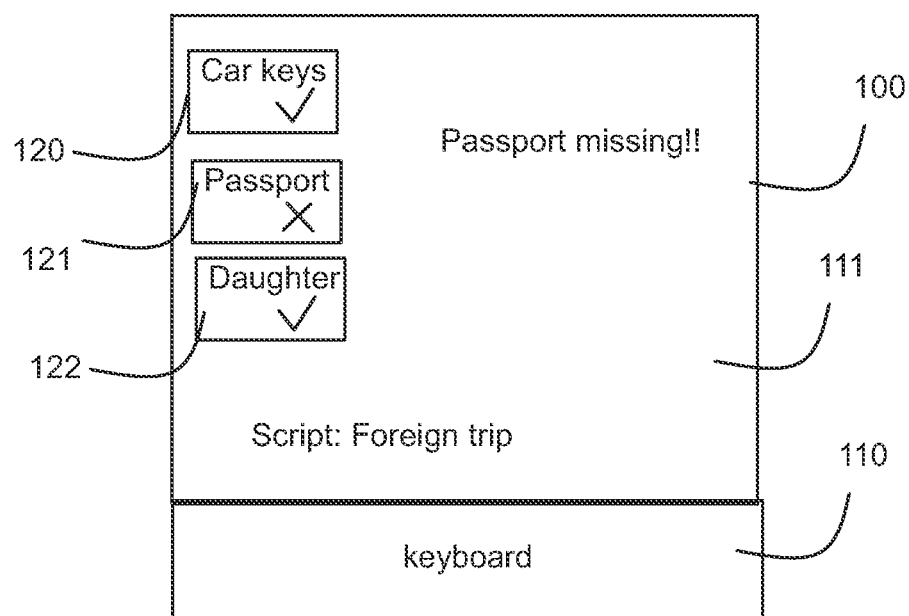
FIG. 3 demonstrates an embodiment 30 of the mobile station user interface in accordance with the invention.

FIG. 3 displays an embodiment 30 of the invention as a user interface diagram. The computer 100 is a mobile phone or a PDA in this embodiment and the screen 111 contains icons 120, 121, 122 which the user has specified as essential for a foreign trip. The user is now in the elevator, and wishes to check whether he has everything he needs with him for a foreign trip. He chooses a pre-programmed computer script "foreign trip" which he himself or someone else has programmed for the purpose of identifying mandatory items for conducting a trip to abroad.

After the user has selected "foreign trip" script the mobile phone will send signals to each and all radio transceiver chip units 140, 141 and 142 which have been programmed into the said script. In one embodiment the range of the signal is very short, say e.g. 0.5-2 m. In this embodiment a response from a radio transceiver chip unit 140, 141, 142 is indicative of presence. If the radio transceiver chip unit responds, it is present, if not, it is absent. In this embodiment radio transceiver chip units 140 and 142 responded because the car keys 130 are in the pocket of the user and the daughter 132 is with the user in the elevator, but the passport 131 was on the kitchen table and its radio transceiver chip unit 141 was out of range, so the mobile station 100 reports the passport 131 as missing to the user, and in some embodiments alerts the user with a sound, vibration or flash of a light and/or screen 111.

In another embodiment, radio transceiver chip units 140, 141, 142 respond back by sending via radio their location data, and the signal typically has a longer range. This longer range could be for example 100 metres or the like for direct communication, and if any of the radio transceiver chip units 140, 141, 142 are connected to a cellular network or GPS this range could be worldwide in those embodiments. In this embodiment, the radio transceiver chip units 140, 141, 142 preferably comprise a GPS transceiver, which provides the location and also preferably the mobile phone 100 comprises a GPS transceiver. Alternatively, it is also possible that the location is deduced relative to the mobile phone 100, i.e. the distance between radio transceiver chip units 140, 141 and 142 and mobile phone 100 is deduced, which could be deduced by response delay time measurements or triangulation. If the relative distance between the radio transceiver chip unit 140, 141, 142 and the mobile phone 100 is too great, the mobile phone deduces that the item associated with radio transceiver chip unit 140, 141, 142 is missing from the user of said mobile phone. For example 2 metres is likely to be a good threshold distance. If the distance between the mobile station 100 and the radio transceiver chip unit 140, 141 142 is greater than 2 metres and the user is on the move, the user has either lost the associated item or forgotten it at home.

When the location of the mobile phone 100 and the time is known by the mobile phone 100, this allows for location and time dependent scripting. For example, if the time is 7-9.30 am, and the user exits his home, the mobile phone could automatically run a "going to work"-script, which would inspect that the user has his wallet, office keys, car keys and briefcase with him. If these items were not detected at that time outside the home with the user, the mobile station 100 would report the missing items to the user and/or alert the user.

The automatic checking of multiple items at a time is a very preferable electronic life management tool in accordance with the invention, which helps the user to not forget things accidentally, especially when there are many essential things to remember. Data can be shared from the inventive item management application on the computer to other applications installed in the computer or in the network in accordance with the invention. For example the results of running item lists, such as "going to work" script, or "foreign trip" script can be transferred to a calendar application. The calendar application can then store the results in accordance with the times when the results were obtained, and the resulting history can further be used as information on where any lost objects might currently be. For example, if a suit was present when the user checked in at Sheraton, and was not present the next morning in the calendar when the user checked out, it is quite probable that the user accidentally left the suit in the Sheraton hotel room 313 where he stayed. It is now easy to call the hotel and inquire about a dark suit, possibly with a photo attached, in room 313, on a specific night, which was left behind.

Further it should be noted that the same radio transceiver chip unit 140, 141, 142 can be labelled on multiple mobile stations or computers. For example the same car keys 130 and the same radio transceiver chip unit 140 could be labelled with icons 120 on multiple mobile stations, for example the husband and the wife could both have icon 120 labelled to the same car key 130 on each of their mobile stations 100. This way, both the husband or the wife can use the inventive system to find the car keys 130, even if the other person and his mobile station or computer 100 are away.

It should be noted that any features, phases or parts of the method 30 can be freely permuted and combined with embodiments 10, 20 and/or 40 in accordance with the invention.

Figure 4:
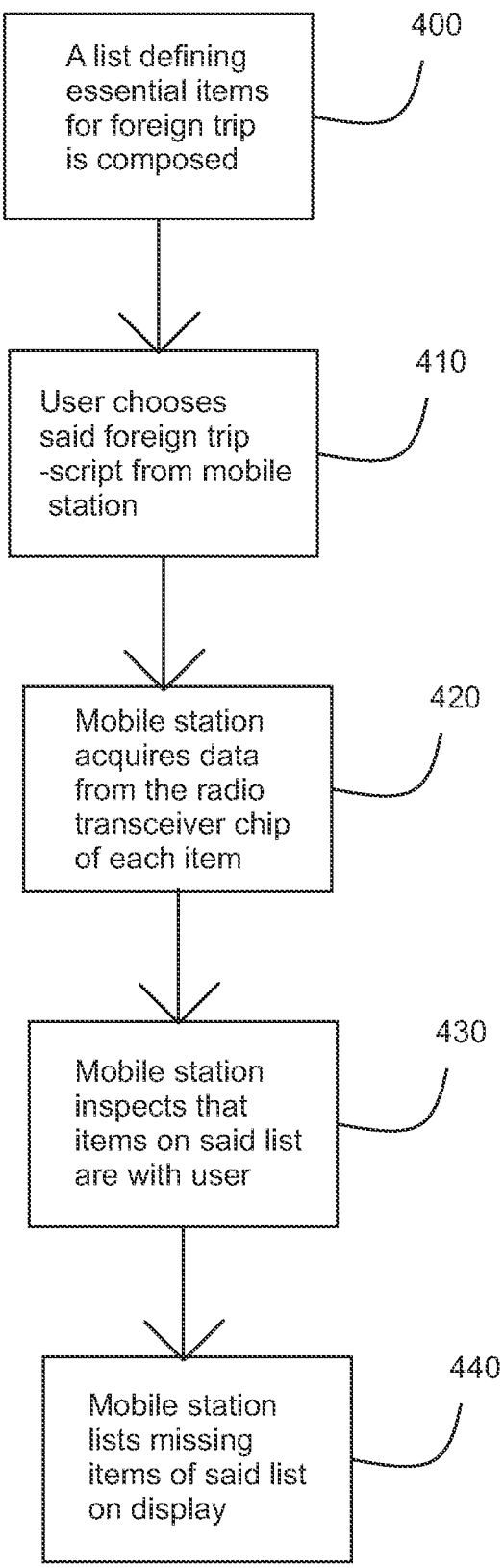
FIG. 4 demonstrates an embodiment 40 of the inventive communication method for managing many personal items in accordance with the invention as a flow diagram.

FIG. 4 displays an embodiment 40 of the invention as a flow diagram. In phase 400 the user composes the list of essential items for a foreign trip, and radio transceiver chips 140, 141, 142 are attached to each item of said list, and each radio transceiver chips 140, 141, 142 is associated with the correct and desired icon in the mobile station 100 of the user, and the said list is stored. Phase 400 typically occurs when the user takes the system into use i.e. makes the first trip with the system. The list typically gets updated as the user adds or deletes items from the list as he acquires essential items or replaces essential items, e.g. buys a new toothbrush, provides it with a new radio transceiver chip unit, and associates said chip unit to an icon in the mobile station. The user then stores the list in the mobile station memory or data storage means or over to a network computer and names it as "foreign trip". The lists can be backed up and stored on network computers in accordance with the invention, automatically, or based on user input.

In phase 410 user chooses said foreign trip script from mobile station, which contains the aforementioned list and associations with radio transceiver chip 140, 141, 142 units. The selection can take place for example by clicking the "foreign trip" script icon on the touch screen of the mobile station. In phase 420 the mobile station acquires data from radio transceiver chips 140, 141, 142. If a particular radio transceiver chip 140, 141, 142 provided a response, or provided location data sufficiently close to the location of the mobile station, the mobile station concludes that item of said list to be present with the user. Those radio transceiver chip 140, 141, 142 units that do not provide a response at all, or provide location data too distant from the mobile station location are listed as missing items, and said missing items are displayed to user on the screen of the mobile station in phase 440.

In one embodiment the user wears one radio transceiver chip unit on himself, and the computer or mobile phone 100 is programmed to use the location of this radio transceiver chip unit as basis for measuring relative or absolute distances, instead of the location of the mobile station.

It should be noted that the Post-it type structure with an adhesive is not a required feature of the invention, it is also possible that in the future every day items in the shop sell with pre-installed radio transceiver chip units of the invention, and as users buy these items, these are automatically, or by the users initiative, activated on the user's mobile phones.

In one embodiment, if the location data returned is too distant from the mobile station, but the location data is similar to a location already stored on the mobile station, such as location of the home apartment of the user, the mobile station may produce a message to the user saying e.g. "You left the shaver at home". This occurs if the missing radio transceiver chip unit was the one associated with the shaver, and returned location data corresponding to the stored home apartment location, or location data sufficiently close to the stored home apartment location data of the user.

It should be noted that the invention allows multiple lists to be stored in the mobile phone of the user, for multiple different life situations of the user. The invention therefore is used to compose an index between life's situations and required equipment, which can be expressed for example with the form of an index relation{life situation}→Index$_r$→{Essential items}. I.e. the invention provides the index relation of everyday physical life for smartphone and radio transceiver chip units using individuals.

It should be noted that any features, phases or parts of the method 40 can be freely permuted and combined with embodiments 10, 20 and/or 30 in accordance with the invention.

It should also be noted that in all preceding embodiments it is possible to replace one or more radio transceiver chip 140, 141, 142 units with a transmit only chip or a receive only chip in accordance with the invention. It should also be noted that in all preceding embodiments it is possible to replace one or more radio transceivers (160) incorporated into a computer (100) with a radio transmitter only or a radio receiver only in accordance with the invention.

The invention has been explained above with reference to the aforementioned embodiments and several commercial and industrial advantages have been demonstrated. The methods and arrangements of the invention allow the user to stay on track of where his belongings are, and inspect whether he has all necessary belongings with him in a very short time. The invention reduces the time spent on looking after lost objects and worrying whether everything was packed and where some items are. Indeed, there is also less need to clean and order things at home when the invention is used, as everything can be located even from a disorderly home with the use of the inventive mobile station and system.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

US 2011/0227726 A1, Lee, Location detection system using an RFID tag.
EP 1908250B1, Brede, Mobile phone with RFID reader and WLAN transmitter integrated on SIM card.
US 2010/0090011, Wee, Radio frequency transponder.

What is claimed is:

1. A method for locating an object, the method comprising:
via an application executed on a mobile electronic device that includes a camera and a short range transceiver:
associating a text string with a wireless chip unit that is associated with the object, the wireless chip unit comprising a wireless chip;
associating an image with the wireless chip unit, the image being representative of the object, the image being generated by the application on the mobile electronic device;
storing, in a memory of the mobile electronic device, the text string and the image;
presenting, on a display of the mobile electronic device, a selectable item corresponding to the wireless chip unit, the selectable item comprising at least one of a portion of the text string and a portion of the image, the selectable item further being configured to indicate whether the wireless chip unit is within a threshold distance of the short range transceiver of the mobile electronic device;
receiving input selecting the selectable item; and
initiating, responsive to the input selecting the selectable item, sending a signal to the wireless chip unit, the signal being addressed to the wireless chip unit based on an association of the input with the object.

2. The method of claim 1, wherein the image comprises a photograph of the object acquired by the camera of the mobile electronic device.

3. The method of claim 2, further comprising capturing the photograph of the object with a camera of the mobile electronic device.

4. The method of claim 1, wherein the wireless chip unit is attached to the object.

5. The method of claim 1, wherein the short range transceiver is a BLUETOOTH transceiver, and wherein initiating sending a signal comprises:
generating the signal for transmission via a BLUETOOTH protocol.

6. The method of claim 1, wherein the signal indicates to the wireless chip unit to produce a sound.

7. The method of claim 1, wherein the selectable item graphically indicates whether the wireless chip unit is within the threshold distance of the mobile electronic device.

8. The method of claim 1, wherein the text string comprises a label that is representative of the object with which the wireless chip unit is associated.

9. The method of claim 1, wherein presenting, on the mobile electronic device, the selectable item corresponding to the wireless chip unit further comprises:
presenting a plurality of selectable items comprising the selectable item and at least a second selectable item that corresponds to a second wireless chip unit.

10. A method for locating an object, the method comprising:
via an application executed on a mobile electronic device that includes a camera and a short range transceiver:
associating a text string with a wireless chip unit that is associated with the object, the wireless chip unit comprising a wireless chip;
associating an image with the wireless chip unit, the image being representative of the object, the image being acquired by the camera of the mobile electronic device;
storing, in a memory of the mobile electronic device, the text string and the image;
presenting, on a display of the mobile electronic device, a graphical item corresponding to the wireless chip unit, the graphical item comprising at least one of a portion of the text string and a portion of the image and being selectable from the display, the graphical item further indicating whether the wireless chip unit is within a threshold distance of the short range transceiver of the mobile electronic device;
receiving input selecting the graphical item from the display; and
initiating, responsive to the input selecting the graphical item, sending a signal to the wireless chip unit, the signal being addressed to the wireless chip unit based on an association of the input with the object.

11. The method of claim 10, wherein the image comprises a photograph of the object.

12. The method of claim 11, further comprising capturing the photograph of the object with a camera of the mobile electronic device.

13. The method of claim 10, wherein the wireless chip unit is attached to the object.

14. The method of claim 10, wherein initiating sending a signal comprises:
generating the signal for transmission via a BLUETOOTH protocol.

15. The method of claim 10, wherein the signal indicates to the wireless chip unit to produce a sound.

16. The method of claim 10, wherein the graphical item graphically indicates whether the wireless chip unit is within a threshold distance of the mobile electronic device.

17. The method of claim 10, wherein the text string comprises a label that is representative of the object with which the wireless chip unit is associated.

18. The method of claim 10, wherein presenting, on the mobile electronic device, the graphical item corresponding to the wireless chip unit further comprises: presenting a plurality of graphical items comprising the graphical item and at least a second graphical item that corresponds to a second wireless chip unit.

19. A method for locating an object using a mobile electronic device, the method comprising:
via an application executed on the mobile electronic device that includes a camera and a short range transceiver:

associating a text string with a wireless chip unit that is associated with the object, the wireless chip unit comprising a wireless chip;

associating an image with the wireless chip unit, the image being representative of the object, the image being acquired by the camera of the mobile electronic device;

storing, in a memory of the mobile electronic device, the text string and the image;

presenting, on a display of the mobile electronic device, a selectable item corresponding to the wireless chip unit, the selectable item comprising at least one of a portion of the text string and a portion of the image;

receiving, via the display of the mobile electronic device, input selecting the selectable item; and generating, responsive to the input selecting the selectable item, a signal to be sent to the wireless chip unit from the mobile electronic device, the signal being addressed to the wireless chip unit based on an association of the input with the object.

20. The method of claim 19, wherein the image comprises a photograph of the object.

21. The method of claim 20, further comprising capturing the photograph of the object with a camera of the mobile electronic device.

22. The method of claim 19, wherein the wireless chip unit is attached to the object.

23. The method of claim 19, wherein initiating sending a signal comprises:

generating the signal for transmission via a BLUETOOTH protocol.

24. The method of claim 19, wherein the signal indicates to the wireless chip unit to produce a sound.

25. The method of claim 19, wherein the selectable item indicates whether the wireless chip unit is within a threshold distance of the mobile electronic device.

26. The method of claim 19, wherein the text string comprises a label that is representative of the object with which the wireless chip unit is associated.

27. The method of claim 19, wherein presenting, on the mobile electronic device, the selectable item corresponding to the wireless chip unit further comprises: presenting a plurality of selectable items comprising the selectable item and at least a second selectable item that corresponds to a second wireless chip unit.

28. A system for locating an object using a mobile electronic device that includes a camera and a short range transceiver, the system comprising:

a wireless chip unit configured to be associated with the object, the wireless chip unit comprising a wireless chip; and an application for execution on the mobile electronic device, the application being configured to:

associate a text string with the wireless chip unit that is associated with the object;

associate an image with the wireless chip unit, the image being representative of the object, the image being acquired by the camera of the mobile electronic device and generated by the application;

store, in a memory of the mobile electronic device, the text string and the image;

present, on a display of the mobile electronic device, a selectable item corresponding to the wireless chip unit, the selectable item comprising at least one of a portion of the text string or a portion of the image, the selectable item further being configured to indicate whether the wireless chip unit is within a threshold distance of the mobile electronic device;

receive input selecting the selectable item; and initiate, responsive to the input selecting the selectable item, sending a signal to the wireless chip unit, the signal being addressed to the wireless chip unit based on an association of the input with the object.

29. The system of claim 28, wherein the wireless chip unit further comprises an adhesive by which the wireless chip unit is attached to the object.

* * * * *